US010752381B2

(12) United States Patent
Riera

(10) Patent No.: US 10,752,381 B2
(45) Date of Patent: Aug. 25, 2020

(54) APPARATUS, SYSTEMS, AND METHODS FOR LIFE VEST IDENTIFICATION, INSPECTION, AND MAINTENANCE

(71) Applicant: Systems and Software Enterprises, LLC, Brea, CA (US)

(72) Inventor: Nuria Riera, Wessling (DE)

(*) Notice: Subject to any disclaimer, the term of this patent is extended or adjusted under 35 U.S.C. 154(b) by 157 days.

(21) Appl. No.: 15/895,536

(22) Filed: Feb. 13, 2018

(65) Prior Publication Data

US 2018/0229862 A1     Aug. 16, 2018

Related U.S. Application Data

(60) Provisional application No. 62/458,908, filed on Feb. 14, 2017.

(51) Int. Cl.
| | | |
|---|---|---|
| *B64F 5/60* | (2017.01) | |
| *B64D 11/00* | (2006.01) | |
| *B64D 11/06* | (2006.01) | |
| *H04B 5/00* | (2006.01) | |

(52) U.S. Cl.
CPC .......... *B64F 5/60* (2017.01); *B64D 11/00151* (2014.12); *B64D 11/0631* (2014.12); *H04B 5/0031* (2013.01); *H04B 5/0056* (2013.01)

(58) Field of Classification Search
CPC . B64F 5/60; B64D 11/00151; B64D 11/0631; H04B 5/0031; H04B 5/0056
USPC ................................................ 455/41.1–41.3
See application file for complete search history.

(56) References Cited

U.S. PATENT DOCUMENTS

| | | | |
|---|---|---|---|
| 7,589,636 B2 * | 9/2009 | Ayyagari | B64D 25/18 |
| | | | 340/572.7 |
| 7,598,868 B2 | 10/2009 | Lee et al. | |
| 7,854,639 B1 | 12/2010 | Leal et al. | |
| 8,812,154 B2 | 8/2014 | Vian et al. | |
| 8,823,554 B2 * | 9/2014 | Yourkowski | G06Q 10/00 |
| | | | 340/945 |
| 8,981,967 B1 * | 3/2015 | Shore | B64F 5/00 |
| | | | 340/945 |
| 9,162,776 B2 | 10/2015 | Shore et al. | |
| 9,697,711 B2 * | 7/2017 | McIntosh | G08B 13/2414 |
| 9,900,645 B1 * | 2/2018 | Perng | H04N 21/41407 |
| 2007/0136152 A1 | 6/2007 | Dunsker et al. | |

(Continued)

FOREIGN PATENT DOCUMENTS

| | | |
|---|---|---|
| KR | 1020160139239 A1 | 12/2016 |
| WO | 2008057679 A2 | 5/2008 |

OTHER PUBLICATIONS

International Search Report and Written Opinion for PCT application No. PCT/US2018/017979 dated May 31, 2018; 14 pgs.

(Continued)

*Primary Examiner* — Jinsong Hu
*Assistant Examiner* — Rui M Hu
(74) *Attorney, Agent, or Firm* — Ryan Dean; Umberg Zipser LLP

(57) ABSTRACT

A life vest inspection system includes a plurality of NFC readers positioned to communicate with at least one NFC tag associated with a life vest or its packaging. The NFC readers are integrated with an in-flight entertainment system, such that the inspection of all life vests can be conducted simultaneously and without a crew member moving throughout the cabin to individually inspect each life vest or row-by row/section by section.

17 Claims, 2 Drawing Sheets

(56) References Cited

U.S. PATENT DOCUMENTS

| | | | | |
|---|---|---|---|---|
| 2007/0229268 | A1* | 10/2007 | Swan | G08B 21/24 340/572.1 |
| 2007/0232164 | A1* | 10/2007 | Swan | B63C 9/20 441/108 |
| 2007/0266782 | A1* | 11/2007 | Bartz | G06Q 10/087 73/156 |
| 2008/0100450 | A1* | 5/2008 | Ayyagari | B64D 25/18 340/572.7 |
| 2008/0108261 | A1* | 5/2008 | Swan | B63C 9/0005 441/89 |
| 2010/0312388 | A1* | 12/2010 | Jang | G06Q 10/0631 700/248 |
| 2013/0307671 | A1* | 11/2013 | Hino | G06K 7/10366 340/6.1 |
| 2014/0036686 | A1* | 2/2014 | Bommer | H04W 24/06 370/241 |
| 2014/0138440 | A1 | 5/2014 | D'Ambrosio et al. | |
| 2014/0189078 | A1* | 7/2014 | Ibrahim | H04L 12/6418 709/221 |
| 2014/0210598 | A1* | 7/2014 | Mitchell | G06K 7/0008 340/10.5 |
| 2015/0339872 | A1* | 11/2015 | de Puiseau | G06Q 10/083 340/5.5 |
| 2016/0267302 | A1* | 9/2016 | Moon | F16L 57/06 |
| 2016/0275769 | A1* | 9/2016 | McIntosh | G08B 13/2414 |
| 2016/0375166 | A1* | 12/2016 | Kreitenberg | A61L 2/10 422/24 |
| 2017/0046543 | A1* | 2/2017 | Shimada | G06K 7/10 |
| 2017/0255855 | A1* | 9/2017 | Jouper | G06K 19/0702 |
| 2018/0146232 | A1* | 5/2018 | Perng | H04N 21/41407 |
| 2018/0150664 | A1* | 5/2018 | Pattar | G01S 3/02 |
| 2019/0016462 | A1* | 1/2019 | White | A45C 13/1053 |
| 2019/0050634 | A1* | 2/2019 | Nerayoff | H04N 7/181 |

OTHER PUBLICATIONS

"RFID Life Jacket / PFD Used to Detect Human Presence in Boat Kill Switch Applications invention" http://www.propellersafety.com/2618/propeller-safety-inventions/rfid-life-jacket-boat-kill-switch/; Downloaded Jun. 13, 2018; 13 pages; posted on Monday, Aug. 29, 2011.
Korean Intellectual Property Office, Written Opinion of the International Preliminary Examining Authority, dated Mar. 29, 2019.

* cited by examiner

APPARATUS, SYSTEMS, AND METHODS FOR LIFE VEST IDENTIFICATION, INSPECTION, AND MAINTENANCE

This application claims priority to U.S. provisional application Ser. No. 62/458,908 filed on Feb. 14, 2017. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is apparatus, systems, and methods for facilitating life vest inspection and maintenance.

BACKGROUND

The background description includes information that may be useful in understanding the present invention. It is not an admission that any of the information provided herein is prior art or relevant to the presently claimed invention, or that any publication specifically or implicitly referenced is prior art.

Life vests are typically installed under or near each seat of an aircraft to ensure there is at least one life vest for each passenger on board. Before boarding, crew members typically inspect to verify that a life vest is stowed under or near each seat and has not been stolen or otherwise removed. During routine maintenance, each life vest may be removed to check the expiration date; however, these inspections can be labor intensive and costly.

In an effort to increase the efficiency of life vest inspections, U.S. patent application Ser. No. 11/694,564 to Bartz et al. discloses the use of radio frequency identification ("RFID") technology and a user interface, which displays inspection information on a screen. RFID tags are installed in/on life vests or their packaging. An airline employee may then move within an aircraft and interrogate the RFID tags row-by-row using an RFID reader. A display shows visual indicia of at least a portion of the aircraft where a life vest is expected to be found. The visual indicia are updated with information read from the RFID tags, such as whether one or more life vests have expired, are about to expire, or are not present. However, Bartz's methods still require an airline employee to move about the cabin to interrogate RFID tags, which have the disadvantages mentioned above. In addition, RFID tags typically require power, increasing the cost of each RFID tag. Ayyagari et al. describe similar methods and systems in U.S. Pat. No. 7,589,636.

U.S. Pat. No. 9,162,776 to Shore et al. describes an aircraft monitoring system in which items, including oxygen generators and life vests are equipped with RFID tags. RFID interrogators are adapted to determine an issue with respect to any of the RFID equipped items and may be integrated into pre-existing systems. Typically, during pre-flight procedures, a flight attendant or other employee walks through the aircraft and uses a RFID interrogator to determine whether any of the RFID equipped items requires service, repair, replacement and/or maintenance. However, Shore's methods still share many or all of the disadvantages described above.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for life vest inspection apparatuses, systems, and methods that (1) save time for life vest inspections before passenger boarding, (2) are inexpensive, (3) do not require powering the component installed on the life vest, and (4) do not require an inspector to go to multiple locations within the cabin.

SUMMARY OF THE INVENTION

The inventive subject matter provides apparatus, systems and methods in which an automated inspection system identifies whether a life vest is present in its proper location (e.g., under a passenger seat), whether the life vest has expired, and/or whether the life vest has been altered or tampered with. Although the below discussion references aircraft, it is contemplated that the system could be used in other vehicles, such as boats, busses, and trains, for example. Furthermore, although life vests are described, the same system could be used with other articles that require constant or periodic monitoring of their location and/or status.

Contemplated life vest inspection systems include near-field communication ("NFC") readers installed where life vests are stowed. Typically, life vests are stowed under each passenger seat, although in some classes of service or for other reasons, life vests may be stowed in a specified compartment or in one or more overhead bins. Each NFC reader is positioned so that it can communicate with passive NFC tags installed in life vests or their packaging. In some embodiments, each NFC tag can correspond to a single NFC reader; however, in other embodiments, it is contemplated that a single NFC reader may be within a range to read two or more NFC tags due to proximity. Because NFC readers typically have a maximum range of about 4 inches (10 centimeters), the NFC tag of each properly stowed life vest should be within the range of at least one NFC reader. In some embodiments, the numbers expressing quantities, properties, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment.

The NFC reader is preferably connected, either wired or wirelessly, to an embedded cabin management system, such as an in-flight entertainment ("IFE") system. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

The cabin management system may provide power to the NFC reader. Additionally, the cabin management system preferably provides the seat number(s) associated with each NFC reader and/or NFC tag. Optionally, the cabin management system may provide a system time to the life vest inspection system.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The following description includes information that may be useful in understanding the present invention. It is not an admission that any of the information provided herein is prior art or relevant to the presently claimed invention, or that any publication specifically or implicitly referenced is prior art.

Figure 1:
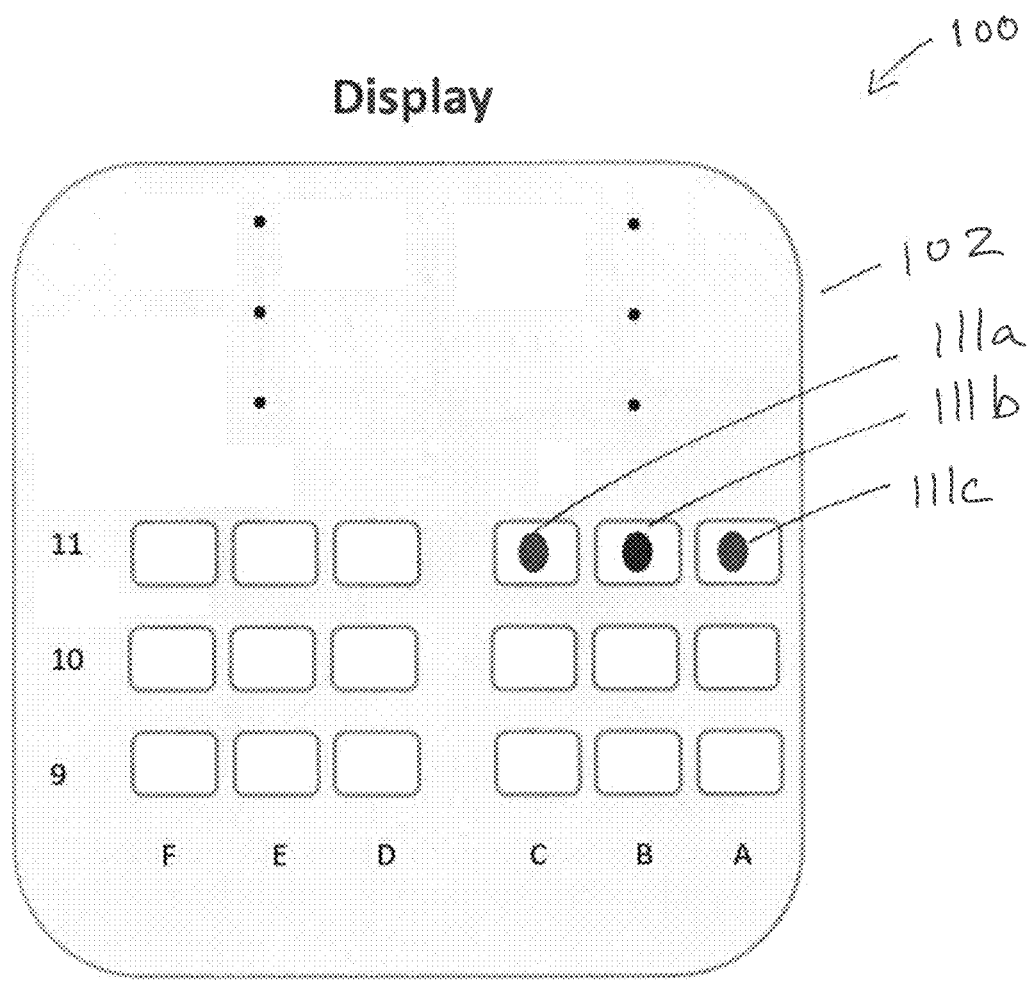
FIG. 1 illustrates one embodiment of a display showing a representation of a portion of the airplane.

FIG. 1 shows a schematic representation of a life vest inspection system 100 for an airplane. The cabin management system 100 preferably includes a display presenting a user interface that depicts a schematic representation of the cabin, which includes seat numbers and the life vest indicator(s) associated with the life vest for each seat. Exemplary life vest indicators include an indication of whether the life vest is detected, not detected (e.g., because the life vest has been stolen or misplaced), has been tampered with (e.g., removed and replaced), is improperly stowed, an expiration date, and/or that the life vest has expired or is about to expire. The NFC reader trigger can be commanded from the central computer or automatically when the life vest is placed under the seat.

When a system time is available, the system may display and/or record what time the status was last updated, and the time when a life vest indicator changes, for example. In one embodiment, the system could cause a message or alarm to sound when a life vest is removed during a flight. Such messages or alerts may prompt a flight attendant to inspect the life vest and assist in making sure that it is properly replaced. The system may also automatically provide the passenger with instructions how to replace the life vest via the IFE system. In another example, the system can record the time when a life vest is removed and from which seat. If the life vest is not replaced, the airline may charge the passenger sitting in that seat for the missing life vest or initiate an investigation.

In some embodiments, a person can initiate an inspection, and the time of the inspection may be saved with the inspection results. The person can then replace a life vest when the display shows that one or more life vests have gone missing or expired.

Display 110 has a user interface showing a representation of a portion of the airplane cabin, and representations for each of the seats in rows 9-11, labeled in columns A-F. Seats 11A, 11B and 11C are illustrated to the right.

Figure 2:
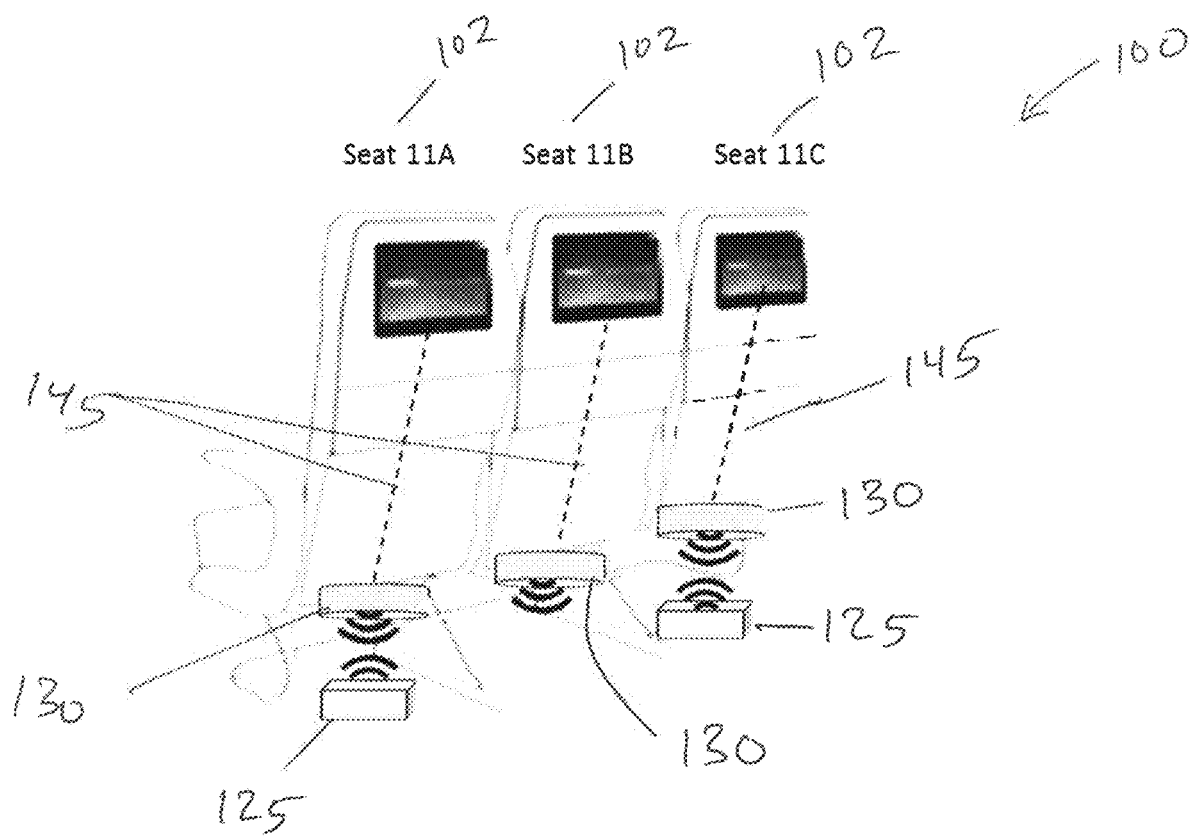
FIG. 2 illustrates one embodiment of a life vest inspection system.

In this embodiment, and as shown in FIG. 2, each seat 102 has an NFC reader 130 placed below the seat 102 and near the life vest 125. However, the specific placement of the NFC reader may vary depending on the configuration of the aircraft, so long as the NFC reader is within a useful range of the one or more NFC tags such that the tag(s) can be read. Optionally, NFC reader 130 is coupled to seat 102. As used in the description herein and throughout the claims that follow, the meaning of "a," "an," and "the" includes plural reference unless the context clearly dictates otherwise. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

NFC readers 130 are coupled to the IFE system 140 via path 145, which may be physical (wired) or wireless. Coupling the cabin management system to each NFC reader 130 allows for information to be transmitted from the NFC reader 130 to the cabin management system. The cabin management system also provides power to the NFC readers 130.

In FIG. 2, NFC readers 130 are shown detecting NFC tags on life vests 120 at seats 11A and 11C. Advantageously, contemplated NFC tags that could be disposed on the life vests 125 are passive and do not require their own power source, thereby decreasing the cost of each NFC tag.

Because there is no life vest under seat 11B, NFC reader 130 does not detect any NFC tag. An indicator for each life vest is illustrated in display 110 in FIG. 1. Life vest indicators 111a and 111c are green indicating that the life vest is present, properly stowed, and/or is not expired. In contrast, life vest indicator 111b is red, indicating that there is no life vest under seat 11B.

The graphical user interface on the display 110 of the cabin management system may additionally or alternatively show the whole cabin or other portions thereof, such as grouping first class, business class, and economy on different screens. In another embodiment, groupings of between 1 and 25 rows, preferably 3-6 rows will be visible at one time, and crew members can scroll through the rows. It is also contemplated that the interface can immediately display a list or graphical view of any missing life vests. Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary. In cases where it is desirable to view additional details about the information collected by the NFC readers, the crew member may zoomin to view 1, 2, 3, 4, or more seats at a time, depending on the amount of information provided for each seat and the size of the display.

With respect to the life vest indicators, a green indicator could indicate that the life vest has not been tampered with and is not expired. A yellow indicator may signify that the NFC tag for a life vest was at least temporarily out of the range of the NFC reader, indicating that the life vest has been removed and replaced, and perhaps tampered with. Thus, a yellow indicator may indicate that a crew member should inspect the corresponding life vest. Additionally or alternatively, a yellow life vest indicator could signify that the life vest will expire soon, such as in one day, one week, or one month. An indicator could also flag that a life vest should be replaced at the next scheduled maintenance inspection, because it will expire before the subsequent scheduled maintenance inspection. In addition to indicating that a life vest is missing, a red indicator may signify that the life vest has expired and needs to be replaced. It should be appreciated that use of other indicators or symbols (e.g., checks and crosses, 0s and 1s, present and absent, or other alphanumeric words/codes) are consistent with the inventive subject matter.

In some embodiments, the NFC readers can be triggered or activated from the cabin management system, such as the central computer of an IFE system. It may also be desirable for the NFC reader to be triggered automatically when the NFC tag on a life vest comes within the range of the NFC reader. After the NFC reader is initially triggered, a crew member may perform an inspection by viewing the graphical user interface to review the life vest indicators from the NFC readers. The crew member may optionally, use the graphical user interface to command the NFC readers to read data from the NFC tags before such an inspection. In another embodiment, the NFC readers continuously or semi-continuously attempt to take readings from the NFC tags within their range, or at defined points of flight (e.g., during the flight attendant checks that occur prior to landing, for example). Readings may also be taken at regular intervals, such as every 10, 15, 20, 30, 45, or 60 minutes. The life vest inspection system may also provide real-time indicators, notification and/or warnings when an indicator changes.

For example, the notification or warning could be a reminder that one life vest of the plurality of life vests will expire within a certain time period, such as one day, one week, or one month. The time could also be set, so an inspector or maintenance technician is instructed to replace life vests at the next maintenance inspection, before the life vests expire.

In another example, the inspection system provides an audio notification in real-time when one life vest indicator of the plurality of life vest indicators changes. This would allow crew members to investigate when a life vest is removed from its stowage location by a passenger, preventing theft and/or to make sure the life vest is not tampered with and is properly replaced. When a life vest expires, it is contemplated that the inspection system could issue an audio or other notice, so a crew member can replace the life vest immediately.

In another embodiment, the graphical user interface displays life vest indicators in a list or table with other information about the each life vest. For example, tables may include seat numbers and installation statuses, expiration dates, expiration statuses, and/or a tamper status. A system time may optionally be displayed as well.

In another aspect of the inventive subject matter, a method of inspecting life vests comprises obtaining a plurality of life vest indicators using a plurality of NFC readers. The plurality of NFC readers reads the plurality of life vest indicators from a plurality of NFC tags on a plurality of life vests or life vest packages. Next, the plurality of life vest indicators is transmitted to a cabin management system. A seat number is assigned to each life vest indicator. A user interface may be depicted on a display of the cabin management system that depicts a schematic representation of at least a part of the cabin. The schematic representation further show the life vest indicators that correspond to each seat number for the part of the cabin displayed. The system then updates the display to show an updated status indicator.

As explained above, the life vest indicators comprise at least one of an installation status, an expiration status, and a tamper status. Methods of inspecting life vests may further comprise a step of triggering the NFC readers from the cabin management system, before the step of obtaining a plurality of life vest indicators. Additionally, or alternatively, the triggering step may be performed automatically when installing a life vest having an NFC tag associated with it or its packaging.

All methods described herein can be performed in any suitable order unless otherwise indicated herein or otherwise clearly contradicted by context.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A life vest inspection system for an airplane having a plurality of seats disposed within the airplane, comprising:
    a cabin management system comprising a display;
    a plurality of near-field communication ("NFC") readers coupled to the cabin management system, wherein each of the NFC readers is disposed at one of the plurality of seats;
    a plurality of NFC tags, wherein each NFC tag is coupled to a life vest or its packaging; and wherein each NFC tag is configured to communicate with the NFC reader disposed at the seat where the NFC tag is located; and
    wherein the cabin management system is configured to present a graphical user interface on the display that depicts a representation of at least a portion of the airplane cabin including the plurality of seats and a plurality of life vest indicators, wherein each life vest of the plurality of life vests is associated with one or more the life vest indicators.

2. The life vest inspection system of claim 1, wherein the cabin management system comprises an in-flight entertainment system.

3. The life vest inspection system of claim 1, wherein the cabin management system is configured to provide power to each of the NFC readers.

4. The life vest inspection system of claim 1, wherein the life vest indicator comprises a seat number of the seat where the life vest indicator is disposed, and at least one of an installation status, an expiration status, and a tamper status of an associated life vest.

5. The life vest inspection system of claim 4, wherein the life vest indicator further comprises a system time.

6. The life vest inspection system of claim 4, wherein the installation status is present when one of the NFC readers detects one of the NFC tags, and absent when the one NFC reader fails to detect the NFC tag.

7. The life vest inspection system of claim 1, wherein the graphical user interface is further configured to display a notification in real-time when one life vest indicator of the plurality of life vest indicators changes.

8. The life vest inspection system of claim 7, wherein the notification comprises an event time.

9. The life vest inspection system of claim 7, wherein the notification comprises a reminder that one life vest of the plurality of life vests will expire within a time period.

10. The life vest inspection system of claim 1, wherein the cabin management system provides an audio notification in real-time when one life vest indicator of the plurality of life vest indicators changes.

11. The life vest inspection system of claim 1, wherein the cabin management system is configured to trigger the plurality of NFC readers.

12. The life vest inspection system of claim 1, wherein each NFC reader is automatically triggered when a life vest is installed at the seat, such that one NFC tag coupled to the life vest or life vest packaging is communicatively coupled to and within range of the NFC reader at the seat.

13. The life vest inspection system of claim 1, wherein each NFC tag is configured to communicate with a distinct NFC reader.

14. A life vest inspection system for an airplane having a plurality of seats disposed within the airplane, comprising:
    a cabin management system comprising a display;
    a plurality of near-field communication ("NFC") readers coupled to the cabin management system, wherein each seat of the plurality of seats is coupled to at least two NFC readers,
    a plurality of NFC tags, wherein each NFC tag is coupled to a life vest or its packaging; and wherein each of the at least two NFC readers is configured to communicate with one of at least two NFC tags, coupled to one life vest or its packaging, and
    wherein the cabin management system is configured to present a graphical user interface on the display that depicts a representation of at least a portion of the airplane cabin including the plurality of seats and a plurality of life vest indicators, wherein each life vest of the plurality of life vests is associated with one or more the life vest indicators, and the life vest indicator changes when at least one of the at least two NFC readers loses communication with one of the at least two NFC tags.

15. A method of inspecting life vests disposed within a cabin of a vehicle having a plurality of seats disposed within the cabin, comprising:

obtaining a plurality of life vest indicators using a plurality of NFC readers installed within the vehicle, with each of the plurality of life vest indicators disposed at a distinct seat of the plurality of seats of the vehicle;

wherein the plurality of NFC readers are each configured to obtain a life vest indicator from at least one NFC tag associated with a life vest or its packaging;

transmitting the obtained life vest indicators to a cabin management system;

assigning each of the obtained life vest indicators to a seat number;

configuring a user interface to display a schematic representation of at least a part of the cabin and at least a portion of the plurality of life vest indicators and the seat number; and updating the representation to show an updated status indicator;

wherein each seat of the plurality of seats is coupled to at least two NFC readers, each of the at least two NFC readers is configured to communicate with one of at least two NFC tags, coupled to one life vest or its packaging, and the life vest indicator changes when at least one of the at least two NFC readers loses communication with one of the at least two NFC tags.

16. The method of claim 15, wherein the step of displaying the portion of the plurality of the life vest indicators comprises displaying at least one of an installation status, an expiration status, and a tamper status for each life vest indicator of the portion of life vest indicators.

17. The method of claim 15, further comprising triggering the NFC readers from the cabin management system, before the step of obtaining a plurality of life vest indicators.

* * * * *